INVENTOR.
LOUIS H. LEONARD, JR.

INVENTOR.
LOUIS H. LEONARD, JR.
BY *Herman Seid*
ATTORNEY.

INVENTOR.
LOUIS H. LEONARD, JR.
BY
ATTORNEY.

United States Patent Office

2,984,990
Patented May 23, 1961

2,984,990

CONTROL ARRANGEMENT FOR ABSORPTION REFRIGERATION SYSTEMS

Louis H. Leonard, Jr., East Syracuse, N.Y., assignor to Carrier Corporation, Syracuse, N.Y., a corporation of Delaware Filed June 12, 1957, Ser. No. 665,206

14 Claims. (Cl. 62—103)

This invention relates to absorption refrigeration systems and, more particularly, to an absorption refrigeration system employing a liquid heating medium in the generator of the system and including a control arrangement designed to reduce scaling in the condenser of the system during periods of operation at reduced loads.

In Leonard Patent No. 2,722,805, granted November 8, 1955, entitled "Control Arrangement for an Absorption Refrigeration System," there is disclosed an absorption refrigeration system employing a saline solution as an absorbent and water as a refrigerant, and utilizing steam as a heating medium in the generator. Capacity control of the system is obtained by regulating the capacity of the condenser to perform work. This control is attained by regulating the flow of condensing water through the condenser or, if desired, control may be achieved by varying the level of condensate in the condenser thereby rendering a portion of the heat exchange surface ineffective to condense refrigerant vapor. The control arrangement permits operation over a range varying from zero load to full or design load.

While the control arrangement disclosed in Patent No. 2,722,805 is perhaps the most simple and economical control to be yet provided for this type of absorption refrigeration system, inherently, it possesses an undesirable characteristic during operation at partial loads, that is, operation at loads less than design capacity of the system. Even during operation at zero load imposed upon the system, it is desirable to continue to supply steam to the generator to preheat solution therein thus providing substantially immediate refrigeration when a load is imposed upon the system. Since, as stated above, the control arrangement functions by varying the flow of condensing water through the condenser, it will be appreciated as the load imposed on the system decreases, flow of condensing water through the condenser is reduced. As flow of condensing water through the condenser is reduced, scaling of the condenser tubes increases. This becomes a serious problem as the load imposed on the system drops off for the control arrangement automatically throttles flow of condensing water in accordance with the new load; throttling flow of condensing water increases the condensing temperature. I have found that for each 10° F. increase in condensing temperature above 95° F. the rate of scaling triples. Thus, for sake of illustration, if the condensing temperature increases from 115° F. at full load to 152° F. at zero load, the rate of scaling is roughly twelve times as great. It will be appreciated this creates a difficult problem during operation at partial loads.

The chief object of the present invention is to provide an absorption refrigeration system so designed as to decrease scaling at reduced loads.

An object of the invention is to provide a control arrangement which improves greatly machine efficiency at partial loads.

An object is to provide a control arrangement for an absorption refrigeration system adapted to regulate operation of the system in such manner as to decrease scaling of the condenser tubes at reduced loads.

A further object is to provide a method of operation of an absorption refrigeration system in which scaling of the condenser tubes is greatly decreased during operation at reduced loads. Other objects of the invention will be readily perceived from the following description.

This invention relates to an absorption refrigeration system which comprises, in combination, an absorber, an evaporator, vapor from the evaporator flowing to the absorber to be absorbed by solution therein, a condenser, a generator, vapor from the generator flowing to the condenser to be condensed therein, condensate from the condenser passing to the evaporator, a liquid medium being employed as the heating medium in the generator, means to supply strong solution from the generator to the absorber, means to supply weak solution from the absorber to the generator, and means to reduce the condensing temperature upon a reduction in load while maintaining flow of solution through the generator substantially constant, thereby substantially reducing scaling in the condenser during periods of operation at reduced loads.

This invention further relates to a method of operation of an absorption refrigeration system in which the steps consist in supplying weak solution from the absorber to the generator, supplying strong solution from the generator to the absorber, passing a heated liquid medium through the generator in heat exchange relation with solution therein to concentrate the solution, vapor so formed passing to the condenser, passing cooling medium through the condenser to condense vapor therein, condensate so formed returning to the evaporator, passing medium to be cooled through the evaporator in heat exchange relation with refrigerant therein, and governing the capacity of the system by regulating the flow of heated liquid medium through the generator.

The attached drawings illustrate a preferred embodiment of the invention, in which.

Figure 1:
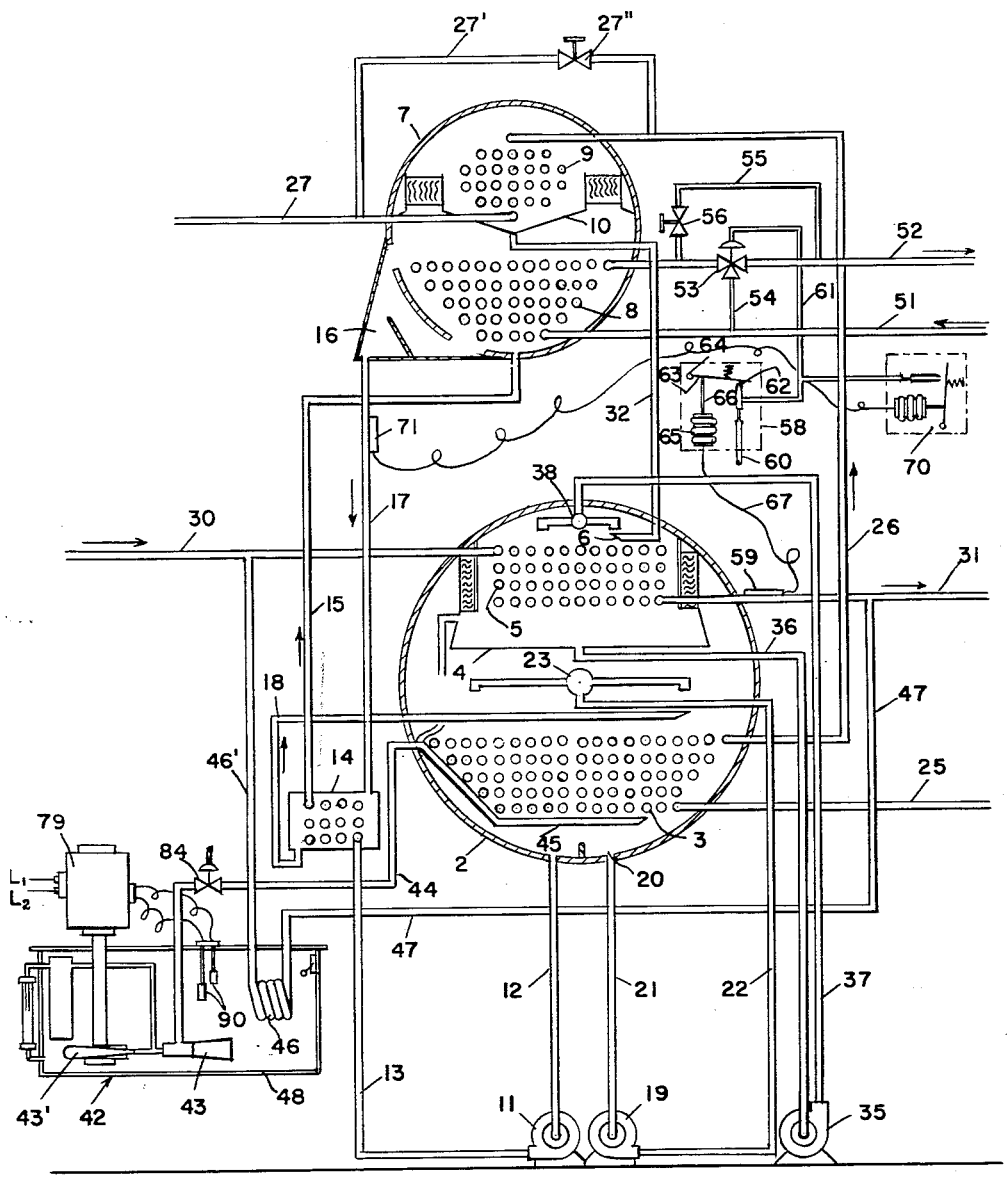
Figure 1 is a diagrammatic view illustrating the absorption refrigeration system of the present invention.

Referring to the attached drawings, there is illustrated diagrammatically in Figure 1 the absorption refrigeration system of the present invention. The system comprises a shell 2, containing a plurality of tubes 3, which cooperate with the shell to form an absorber. Placed in shell 2 above absorber 3 is a pan-like member which cooperates with shell 2 to form an evaporator 4. A plurality of tubes 5 extend longitudinally of the shell above the pan-like member. Medium to be cooled passes through these tubes in heat exchange relation with liquid refrigerant sprayed thereover. A vapor condensate return header 6 is placed over the tubes 5 and serves to discharge condensate thereover.

A second shell 7, preferably, is placed above the first shell. Tubes 8 extend in the lower portion of shell 7 and cooperate with shell 7 to form a generator. A plurality of tubes 9 are placed in the upper portion of shell 7 to form a condenser. The tubes 9 cooperate with a pan-like member 10 to form the condenser. Both shells are supported in desired position on supports (not shown).

Pump 11 withdraws weak solution from absorber 3 through line 12. Pump 11 forwards weak solution through line 13 to heat exchanger 14 in which the weak solution is placed in heat exchange relation with strong solution returning from the generator as hereinafter described. The weak solution is then forwarded from heat exchanger 14 through line 15 to generator 8. Strong solution flows from generator 8 through overflow arrangement 16, line 17, heat exchanger 14, and line 18 to the absorber, preferably, being discharged therein adjacent one end of shell 2. Strong solution flows through forces of gravity from the generator to the absorber. It will be understood, of course, if desired, the strong solution may be discharged in the absorber over the tubes therein. Flow of solution through the generator is substantially constant.

Pump 19 serves as an absorber pump and is employed to withdraw a solution of intermediate concentration from absorber 3 through outlet 20 and line 21. Pump 19 forwards the solution of intermediate concentration through line 22 to the absorber. Spray arrangement 23 serves to distribute the recirculated solution over the tubes throughout the length of the absorber 3. It will be understood that the strong solution mixes to some extent with solution in the absorber and that further mixing occurs as the pump 19 forwards the mixed solution so that a solution having a concentration intermediate the concentration of the strong and weak solutions is circulated. Reference is made to co-pending application, Serial No. 505,369, filed April 8, 1955, in the name of Louis H. Leonard, Jr., now Patent No. 2,840,997 granted July 1, 1958, for a more detailed description of the flow of solution in the system.

Condensing water is forwarded by a pump (not shown) through line 25 to the tubes 3 of the absorber. The condensing water passes from the tubes 3 of the absorber through line 26 to the tubes 9 of the condenser. Condensing water leaves the tubes 9 of the condenser through line 27. Under some circumstances, if desired, a bypass line 27' may be provided about the condenser, a manual valve 27" being placed in line 27'. Line 27' permits an initial adjustment of the flow of condensing water through the condenser so that the proper condensing temperature is maintained for full load operation.

Medium to be cooled is forwarded by a pump (not shown) through line 30 to the tubes or coil 5 of evaporator 4. The cooled medium leaves the tubes 5 through line 31 and is forwarded to a place of use such as the central station of an air conditioning system. The medium, after passing through the central station, returns to the evaporator 4 through line 30 to be again cooled and reused.

Condensate leaves condenser 9 through line 32 and is returned to header 6 in the evaporator and discharged in the evaporator over the tubes 5 to wet the tubes. It will be appreciated the refrigerant is flashed or vaporized to cool the same upon its discharge in the evaporator and is vaporized by its heat exchange relation with medium passing through the tubes of the evaporator. The flashed vapor passes to absorber 3 to be absorbed by the solution therein.

Pump 35 serves to recirculate liquid refrigerant collected in the evaporator. Pump 35 is connected to the evaporator by line 36 to withdraw liquid refrigerant therefrom. Pump 35 forwards the liquid refrigerant through line 37 to spray arrangement 38 of the evaporator, the liquid refrigerant flash cooling upon discharge in the evaporator, remaining liquid refrigerant wetting the tubes to cool medium passing through the tubes. The heat exchange relation between medium passing through the tubes and the liquid refrigerant on the exterior of the tubes cools the medium and evaporates the liquid refrigerant. The vapor passes to the absorber as previously described.

A suitable purge arrangement indicated generally at 42 is provided to remove non-condensible gases from the absorber. The ejector 43 of purge arrangement 42 is connected by line 44 to a purge line 45 extending longitudinally of the absorber. The cooling coil 46 of purge arrangement 42 is connected to line 30 by line 46' and to line 31 by line 47, permitting medium to be employed for cooling solution in the purge tank 48. The purge arrangement 42 is disclosed and claimed in co-pending application, Serial No. 565,324, filed February 14, 1956, in the name of Louis H. Leonard, Jr., now United States Patent No. 2,940,273, granted June 14, 1960, and reference is made to such application for a more complete description of the purging arrangement.

A more detailed description of the absorber and the evaporator are disclosed and claimed in co-pending application, Serial No. 580,052, filed April 23, 1956, now Patent No. 2,918,807, granted December 29, 1959, in the name of Louis H. Leonard, Jr.

Hot water is supplied to the generator through line 51, passes through the tubes of the generator 8 in heat exchange relation with solution in the generator and leaves the generator through line 52. A three-way modulating valve 53 is placed in line 52 and connected to line 51 by line 54, as indicated in Figure 1, to regulate the amount of hot water passing through the generator or bypassing the generator. Valve 53 is automatically operated as hereinafter described. A bypass line 55 connected to line 52 on opposite sides of valve 53 assures that hot water flows through the generator even when valve 53 is closed, thus preventing stagnation of water in the generator tubes and assuring preheating of the solution when the system is in operation even at zero load, permitting refrigeration to be available substantially immediately when a load is imposed upon the system thus preventing on-off operation and eliminating cycling of the controls. A manually operable valve 56 is placed in line 55 to control flow of water through line 55. The term "hot water" as used herein is employed to indicate water at a temperature within the range of about 210° F. to about 600° F. It will be understood other liquid mediums may be employed instead of water to supply heat to the generator, if desired.

Valve 53 is regulated by a control 58, which may be pneumatically operated, and which is actuated by a temperature sensing element 59 such as a bulb placed adjacent the line through which cooled medium leaves the evaporator, thus sensing or responding to the temperature of cooled medium leaving the evaporator which, in effect, indicates the load imposed upon the system. Control 58 regulates valve 53 to vary the amount of hot water flowing through the tubes of the generator or bypassing the generator through line 54.

Any suitable control, of course, may be employed. As illustrated diagrammatically in Figure 1, compressed air is supplied through air line 60 to control 58 and through air line 61 to valve 53 to actuate valve 53. Control 58 includes a bleed nozzle 62 closed by a flapper 63 pivoted at one end 64. A bellows 65 is connected by an arm 66 to the flapper, expansion and contraction of the bellows serving to move the flapper away from and toward the nozzle, permitting compressed air to bleed through the nozzle. The bellows 65, bulb 59 and capillary 67 connecting them, form part of a thermal expansion system containing a suitable fill so that an increase or decrease in temperature of cooling medium leaving the evaporator is reflected in control 58 serving to vary the air pressure imposed upon valve 53 to regulate the amount of hot water passing through the generator or bypassing the generator.

A second control 70 is provided to regulate the maximum concentration of solution leaving the generator. As illustrated diagrammatically in Figure 1, this control may be similar to control 58 and is connected to air line 61 connecting control 58 with valve 53. Control 70 is connected to a temperature sensing element 71 such as a bulb placed in a well in the generator or adjacent the strong solution line leaving the generator so that it reflects the temperature of strong solution leaving the generator. When a predetermined maximum concentration of solution leaving the generator is attained, as reflected by the temperature of such solution, control 70 bleeds air from line 61 permitting valve 53 to move toward a position substantially discontinuing the flow of hot water through the generator and permitting the water to flow through bypass 54 without passage through the tubes of the generator.

The control arrangement is designed to actuate capacity control valve 53 to modulate the amount of hot water flowing through the generator or bypassing the generator responsive to the load imposed on the system as reflected by the temperature of cooled medium leaving the evaporator. In addition, the control arrangement includes a safety control designed to prevent any concentration greater than a desired maximum concentration of strong solution leaving the generator.

The electrical circuit of the control arrangement includes starters 72, 73, 74, 75, 76, for the motors 77, 78, 79, 80, 81, which serve to actuate the condenser water pump (not shown), the chilled water pump (not shown), the purge pump 43', the solution pump 11 and the evaporator pump 35, respectively. Push button 82 having "stop-and-go" positions is included in the circuit to permit simple, ready operation of the system. The circuit also includes an electric pneumatic relay 83 which supplies compressed air to the controls 58 and 70, valve 53, and purge valve 84. A control relay 85 controls push button 82, upon operation of a safety control, as hereinafter explained.

Liquid level control 86 is employed in the purge arrangement, as explained in the co-pending application referred to above. The main panel terminal block of the circuit is shown at 87. Safety control 88 is provided to prevent freezing of the evaporator in the event of improper operation. Safety control 89 is employed in the purge arrangement and comprises a high level float switch which serves to prevent overflow from the purge tank. The control probes 90 are employed in the purge arrangement as described in the co-pending application referred to above.

The elements included in the control arrangement are standard and may be purchased in the open market. For example, the elements may be obtained as follows:

| | Supplier | Part Number |
| --- | --- | --- |
| Liquid level control | Photoswitch, Inc. | 10CB4 Model 1001. |
| Control relay | General Electric Co. | CR2820-1740-2. |
| E. P. relay | Minneapolis Honeywell Regulator Co. | R0400A. |
| Insertion thermostat or temperature sensing element. | do | 921A2. |
| Low temperature safety control. | do | T414A. |
| Pressure switch | do | L404B. |
| High level safety control. | Mercoid Corp. | Type 41, Spec. 6108. |
| Probe Assembly | Photoswitch, Inc. | 67DJ2 Model 1000. |
| Three-way modulating valve. | Minneapolis Honeywell Regulator Co. | Series 800. |
| Capacity control thermostat. | do | 704-P1P1-91. |
| Concentration control thermostat. | do | 704-P1P1-91. |

The preferred absorbing solution is a solution of lithium bromide and water. The preferred refrigerant is water. Preferably, the solution concentration leaving the generator is about 66%. As stated above, a greater concentration may permit crystallization to occur, causing solidification in the heat exchanger and perhaps in other portions of the system.

The term "weak solution" is used herein to describe a solution weak in absorbing power. The term "strong solution" is used herein to define a solution strong in absorbing power.

Figure 2:
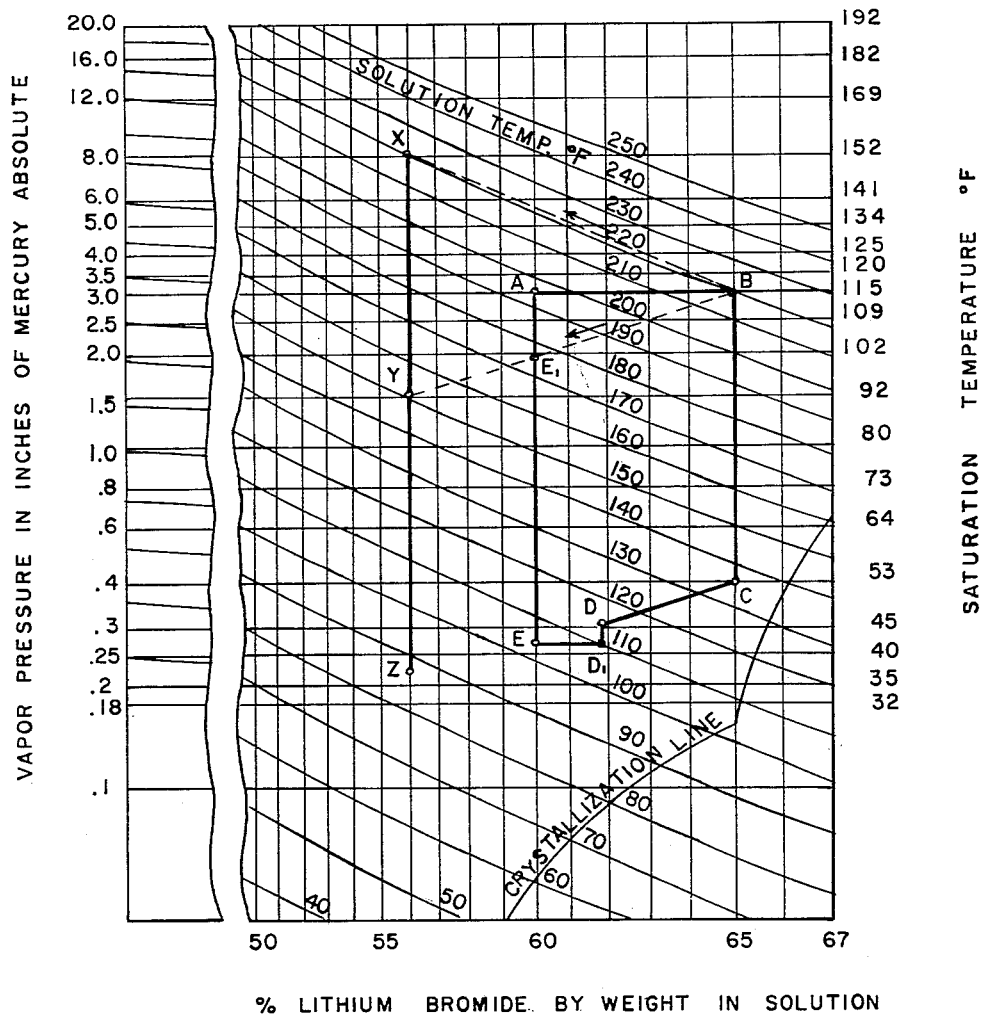
Figure 2 is a graph illustrating the cycle of operation of the system at full load and at zero load.
Figure 3:
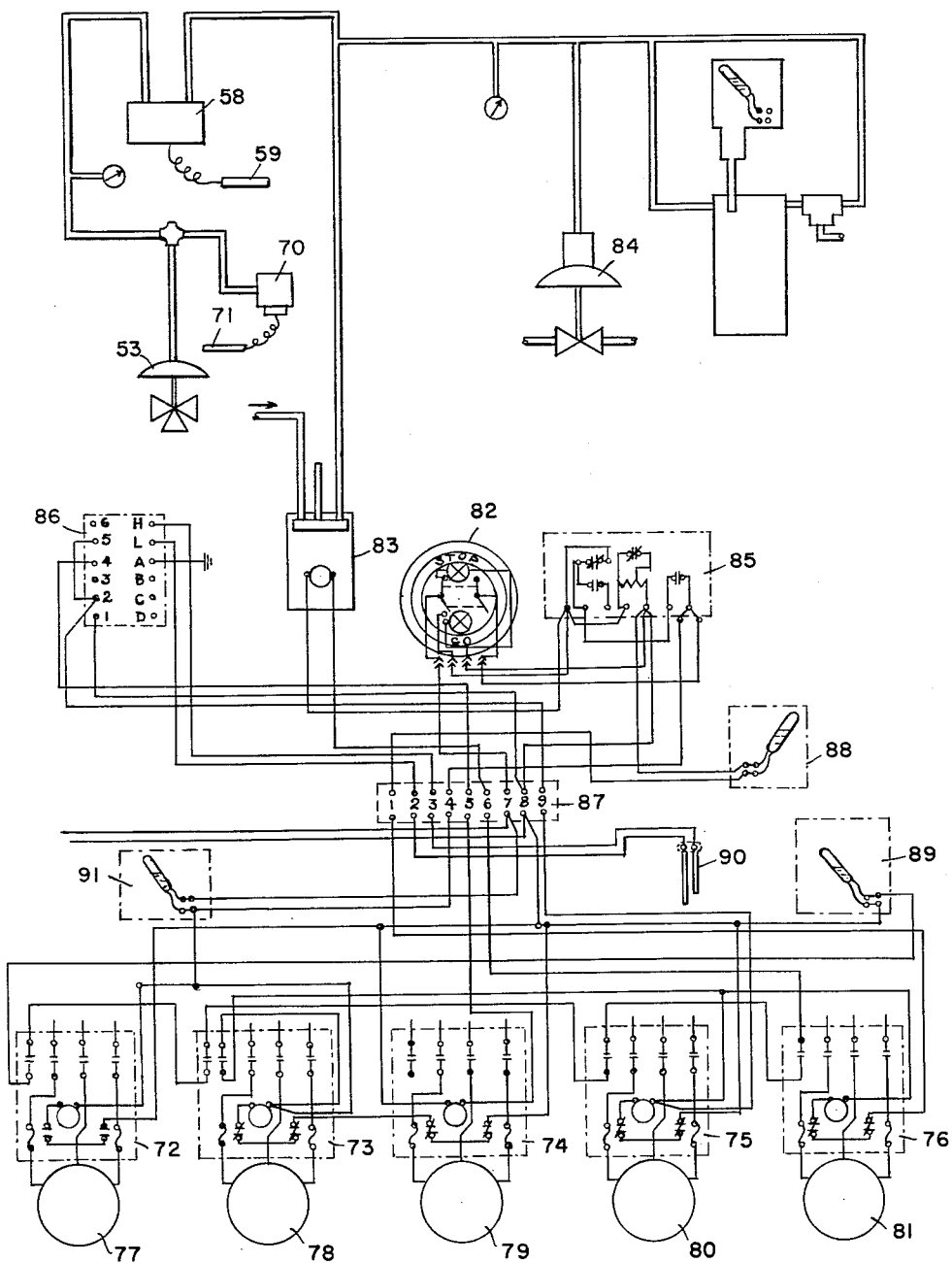
Figure 3 is a wiring diagram of the control mechanism for the system shown in Figure 1.

In Figure 2, there is represented a graph illustrating the cycle of operation of an absorption refrigeration system embodying the present invention employing hot water as the heating medium in the generator as compared to the cycle of operation of an absorption refrigeration system as, for example, disclosed in Patent No. 2,722,805, employing steam as a heating medium in the generator. The solid lines show that the cycle of operation in both systems is the same at full load. Line AB represents passage of solution in the generator during the concentration process. Line BC represents passage of strong solution from the generator through the heat exchanger at a constant concentration in heat exchange relation with weak solution flowing through the heat exchanger from the absorber to the generator. Line CD represents the mixing of the weak recirculated solution and the strong solution returning from the generator, giving a decrease in both solution temperature and concentration. Line D—D' represents the flash cooling of the mixed recirculated solution as it enters the absorber shell. Line D'—E represents the dilution process in the absorber as the solution absorbs refrigerant vapor. Line E—E' represents the passage of weak solution from the absorber to the generator through the heat exchanger in heat exchange relation with strong solution at a constant concentration. Line E'—A represents the preheating of the weak solution in the generator before the concentration process takes place. This preheating is accomplished by the generator heating medium.

If we assume a system in which steam is employed as a heating medium and flow of condensing water through the condenser is throttled upon reduction in load, then depending upon the degree of partial load, the solution temperature will remain substantially constant but the condensing temperature will increase, as indicated by a shift in point B along the dotted line, toward the left as shown in the diagram to point X which indicates zero load imposed upon the system. It will be observed from the diagram that condensing temperature has increased from 115° F. at full load to 152° F. at zero load. Since the rate of scaling triples for each 10° F. increase in temperature above 95° F. it will be appreciated the rate of scaling increases about twelve times as great at zero load as it is at full load. It will be understood, of course, that the steam pressure in the generator is maintained substantially constant, resulting in a substantially constant leaving strong solution temperature.

However, in the present invention, upon a reduction in load imposed upon the system, flow of condensing water remains substantially constant while the flow of hot water through the tubes of the generator is throttled. Thus condensing temperature is reduced, point B moving toward the left along the line YB as shown in the diagram to the point Y at zero load. The condensing temperature thus decreases from 115° F. at full load to 92° F. at zero load with a great reduction in scaling. Strong solution temperature leaving the generator goes from 220° F. at full load down to about 148° F. at zero load. The improved machine efficiency at zero load operation is in direct proportion to the lengths of the line ZX as against line ZY, resulting in greatly improved partial load machine performance.

The line ZX represents the cycle employing steam as a heating medium at zero load while the line YZ represents the cycle of the present invention at zero load employing hot water as the heating medium at zero load.

Considering operation of the absorption refrigeration system, when the push button 82 is moved to its "go" position, current is supplied to energize motors 77, 78, 79, 80 and 81, actuating the condensing water pump, the chilled water pump, the purge pump 43', the solution pump 11 and the evaporator pump 35. The electric pneumatic relay is energized providing compressed air through control 58 to valve 53 to open the valve to permit hot water to flow through the tubes of the generator to heat solution therein.

The condensing water pump supplies condensing water through the tubes of absorber 3 and the tubes of condenser 9 in heat exchange relation with solution in the absorber and with vapor in the condenser. The chilled water pump circulates cooled medium from the evaporator 5 through line 31 to a place of use and returns the medium therefrom through line 30 to the tubes of the evaporator.

Purge pump 43' circulates solution in the tank of purge arrangement 42 thereby actuating the ejector 43 to induce non-condensible gases from absorber 3. Solution pump 11 withdraws weak solution from the absorber and forwards the weak solution through heat exchanger 14 to generator 8, strong solution returning from the generator through line 17, heat exchanger 14 and line 18 to the absorber. Pump 19, preferably driven by the solution pump motor, recirculates a solution of intermediate concentration in the absorber. The evaporator pump 35 withdraws refrigerant from evaporator 4 and recirculates the withdrawn refrigerant to the evaporator where it is discharged over the tubes 5 therein, thus cooling medium passing through the tubes. The machine is thus placed in operation to provide refrigeration at full capacity.

During operation, of course, the capacity of the system is varied by varying the amount of hot water flowing through the tubes of the generator or through the bypass line 54 by regulating valve 53 by means of control 58 responsive to the temperature of cooled medium leaving the evaporator through line 31 as reflected by bulb 59. If, during operation at partial loads, concentration of solution leaving the generator increases to the predetermined maximum concentration as reflected by temperature of solution leaving the generator, control 70 responds to throttle flow of hot water through the tubes of the generator, thus substantially discontinuing heating of solution in the generator to reduce the concentration of solution leaving the generator.

At full load, control 58 regulates the valve 53 in such manner that hot water flows through the tubes of the generator in heat exchange relation with solution therein, little or no water passing through the bypass 54 about the generator. However, as the load imposed upon the system decreases, control 58 modulates valve 53 so that less hot water is permitted to pass through the tubes of the generator while an increased amount of hot water passes through bypass 54. All the time, of course, an extremely minor flow of hot water passes through bypass line 55 about valve 53, the amount being determined by the setting of valve 56. This assures that even at zero load, solution in the generator is preheated, as represented by line ZY in Figure 2, to permit refrigeration to be provided immediately upon the application of a load.

It will be appreciated that under some circumstances at partial load, solution leaving the generator may have a tendency toward concentration above a predetermined maximum concentration. This tendency, of course, is reflected by the temperature of solution leaving the generator. Under such circumstances, control 70 actuates valve 53 to reduce the rate of flow of hot water through the tubes of the generator until the temperature of solution leaving the generator has been reduced to a desired point reflecting concentration of solution leaving the generator.

While I have disclosed valve 53 as a three-way modulating type valve, it will be appreciated other valves may be used. In such case, of course, it would be desirable to include a valve in the bypass which may also be regulated similarly to the valve in the hot water supply or discharge lines.

The present invention provides an efficient, economical absorption refrigeration system which may be controlled to substantially eliminate scaling of the tubes of the condenser at partial loads. The control arrangement of the present invention provides increased efficiency at partial load and at zero load operation because the temperature spread between the high side and the low side of the system is continually reduced. As discussed previously, scaling in the system is reduced greatly while system pull-down at start-up is greatly improved. These advantages derive in large part from the control arrangement which regulates flow of heating liquid through the tubes of the generator rather than steam supply to the generator.

Start-up of the system is greatly improved because heat input is not limited by the capacity of steam condensate drain lines, sizes of steam traps, etc. The system cannot be damaged by overloads during start-up periods. Machine capacity at elevated chilled water temperatures may be double or triple that of design conditions at lower temperatures.

While I have described a preferred embodiment of the invention it will be understood that the invention is not limited thereto since it may be otherwise embodied within the scope of the following claims.

I claim:

1. In an absorption refrigeration system, the combination of an absorber, an evaporator, vapor from the evaporator flowing to the absorber to be absorbed by solution therein, a condenser, a generator, vapor from the generator flowing to the condenser to be condensed therein, condensate from the condenser passing to the evaporator, a liquid line to supply heated liquid medium to the generator to serve as a heating medium therein, a return line for the heated liquid medium after its passage through the generator, means to supply weak solution from the absorber to the generator, means to supply strong solution from the generator to the absorber, a valve placed in one of said lines to regulate flow of the heated liquid medium through the generator, control means for actuating said valve to reduce the condensing temperature upon a reduction in load thereby substantially reducing scaling in the condenser during periods of operation at reduced loads and second control means for actuating said valve to regulate the maximum concentration of solution leaving the generator responsive to the temperature of strong solution leaving the generator.

2. An absorption refrigeration system according to claim 1 in which the first control means are responsive to the temperature of cooled medium leaving the evaporator.

3. In an absorption refrigeration system, the combination of an absorber, an evaporator, vapor from the evaporator flowing to the absorber to be absorbed by solution therein, a condenser, a generator, vapor from the generator flowing to the condenser to be condensed therein, condensate from the condenser passing to the evaporator, a hot water line to supply hot water to the generator to serve as a heating medium therein, a return line for the hot water after its passage through the generator, means to supply weak solution from the absorber to the generator, means to supply strong solution from the generator to the absorber, a valve placed in one of said lines to regulate flow of hot water through the generator, control means responsive to the temperature of cooled medium leaving the evaporator to reduce condensing temperature upon a reduction in load thereby substantially reducing scaling in the condenser during periods of operation at reduced loads, a bypass line about the hot water valve, a second valve in the bypass line to regulate passage of hot water therethrough to assure flow of hot water through the generator regardless of load to provide preheating of solution in the generator even at zero load, and a second bypass line about the generator for hot water, the amount of hot water flowing through the second bypass line being regulated by the hot water valve.

4. An absorption refrigeration system according to claim 3 in which means are provided for regulating the maximum concentration of solution leaving the generator responsive to the temperature of strong solution leaving the generator.

5. In an absorption refrigeration system, the combination of an absorber, an evaporator, vapor from the evaporator flowing to the absorber to be absorbed by solution therein, a condenser, a generator, vapor from the generator flowing to the condenser to be condensed therein, condensate from the condenser passing to the evaporator, a hot water line to supply hot water to the generator to serve as a heating medium therein, a return line for the hot water after its passage through the generator, means to supply weak solution from the absorber to the generator, means to supply strong solution from the generator to the absorber, a valve placed in one of said lines to regulate flow of hot water through the generator, control means responsive to the temperature of cooled medium leaving the evaporator to reduce condensing temperature upon a reduction in load thereby substantially reducing scaling in the condenser during periods of operation at reduced loads, a bypass line about the hot water valve, a second valve in the bypass line to regulate passage of hot water therethrough to assure flow of hot water through the generator regardless of load to provide preheating of solution in the generator even at zero load, a second bypass line about the generator for hot water, the amount of hot water flowing through the second bypass line being regulated by the hot water valve, and means for regulating the maximum concentration of solution leaving the generator responsive to the temperature of strong solution leaving the generator.

6. In a method of operation of an absorption refrigeration system, the steps which consist in supplying weak solution from the absorber to the generator, supplying strong solution from the generator to the absorber, passing a heated liquid medium through the generator in heat exchange relation with solution therein to concentrate the solution, vapor so formed passing to the condenser, passing cooling medium through the condenser to condense vapor therein, condensate so formed returning to the evaporator, passing medium to be cooled through the evaporator in heat exchange relation with refrigerant therein, reducing the condensing temperature responsive to the temperature of cooled medium leaving the evaporator thereby substantially reducing scaling in the condenser during periods of operation at reduced loads, varying the flow of heated liquid medium through the generator responsive to the temperature of cooled medium leaving the evaporator, and controlling the flow of heated liquid medium through the gnerator in such manner as to provide preheating of solution in the generator even at zero load.

7. In an absorption refrigeration system, the combination of an absorber, an evaporator, vapor from the evaporator flowing to the absorber to be absorbed by solution therein, a condenser, a generator, vapor from the generator flowing to the condenser to be condensed therein, condensate from the condenser passing to the evaporator, a line to supply hot water to the generator to serve as a heating medium therein, a return line for the hot water after its passage through the generator, means to supply weak solution from the absorber to the generator, means to supply strong solution from the generator to the absorber, a hot water valve placed in one of said lines to regulate flow of the hot water through the generator, control means for actuating said valve to reduce the condensing temperature upon a reduction in load thereby substantially reducing scaling in the condenser during periods of operation at reduced loads, a bypass line about the hot water valve, and a second valve placed in the bypass line to regulate passage of hot water through the bypass line thereby permitting flow of some amount of hot water through the generator regardless of load to assure preheating of solution in the generator even at zero load.

8. In an absorption refrigeration system, the combination of an absorber, an evaporator, vapor from the evaporator flowing to the absorber to be absorbed by solution therein, a condenser, a generator, vapor from the generator flowing to the condenser to be condensed therein, condensate from the condenser passing to the evaporator, a line to supply hot water to the generator to serve as a heating medium therein, a return line for the hot water after its passage through the generator, means to supply weak solution from the absorber to the generator, means to supply strong solution from the generator to the absorber, a hot water valve placed in one of said lines to regulate flow of the hot water through the generator, control means for actuating said valve to reduce the condensing temperature upon a reduction in load thereby substantially reducing scaling in the condenser during periods of operation at reduced loads, and a bypass about the generator for hot water, the amount of hot water flowing through the generator bypass being regulated by the hot water valve.

9. In an absorption refrigeration system, the combination of an absorber, an evaporator, vapor from the evaporator flowing to the absorber to be absorbed by solution therein, a condenser, a generator, vapor from the generator flowing to the condenser to be condensed therein, condensate from the condenser passing to the evaporator, a line to supply hot water to the generator to serve as a heating medium therein, a return line for the hot water after its passage through the generator, means to supply weak solution from the absorber to the generator, means to supply strong solution from the generator to the absorber, a hot water valve placed in one of said lines to regulate flow of the hot water through the generator, control means to actuate said valve to reduce the condensing temperature upon a reduction in load thereby substantially reducing scaling in the condenser during periods of operation at reduced loads, a bypass line about the hot water valve, a second valve in the bypass line to regulate passage of the hot water through the bypass line thereby permitting flow of some amount of hot water through the generator regardless of load to assure preheating of solution in the generator even at zero load, and means for regulating the maximum concentration of solution leaving the generator responsive to the temperature of strong solution leaving the generator.

10. In an absorption refrigeration system, the combination of an absorber, an evaporator, vapor from the evaporator flowing to the absorber to be absorbed by solution therein, a condenser, a generator, vapor from the generator flowing to the condenser to be condensed therein, condensate from the condenser passing to the evaporator, a line to supply hot water to the generator to serve as a heating medium therein, a return line for the hot water after its passage through the generator, means to supply weak solution from the absorber to the generator, means to supply strong solution from the generator to the absorber, a hot water valve placed in one of said lines to regulate flow of the hot water to the generator, control means for actuating said valve to reduce the condensing temperature upon a reduction in load thereby substantially reducing scaling in the condenser during periods of operation at reduced loads, a bypass about the generator for hot water, the amount of hot water flowing through the generator bypass being regulated by the hot water valve, and means for regulating the maximum concentration of solution leaving the generator responsive to the temperature of strong solution leaving the generator.

11. In an absorption refrigeration system, the combination of an absorber, an evaporator, vapor from the evaporator flowing to the absorber to be absorbed by solution therein, a condenser, a generator, vapor from the generator flowing to the condenser to be condensed therein, condensate from the condenser passing to the evaporator, a liquid medium being employed as the heating medium in the generator, means to supply strong solution from the generator to the absorber, means to supply weak solution from the absorber to the generator, means to reduce the condensing temperature upon a reduction in load by regulating the passage of heated liquid medium through the generator while maintaining flow of solution through the generator substantially constant thereby substantially reducing scaling in the condenser during periods of operation at reduced loads, means for regulating the maximum concentration of solution leaving the generator responsive to the temperature of strong solution leaving the generator, said means to reduce the condensing temperature being responsive to the temperature of cooled medium leaving the evaporator.

12. In an absorption refrigeration system, the combination of an absorber, an evaporator, vapor from the evaporator flowing to the absorber to be absorbed by solution therein, a condenser, a generator, vapor from the generator flowing to the condenser to be condensed therein, condensate from the condenser passing to the evaporator, a line to supply a liquid heating medium to the generator to serve as a heating medium therein, a return line for the liquid heating medium after its passage through the generator, means to supply weak solution from the absorber to the generator, means to supply strong solution from the generator to the absorber, valve means to regulate flow of the liquid heating medium through the generator, control means for actuating said valve means to reduce the condensing temperature upon a reduction in load thereby substantially reducing scaling in the condenser during periods of operation at reduced loads, and a bypass about the generator for liquid heating medium, the amount of liquid heating medium flowing through the generator bypass being regulated by the valve means.

13. An absorption refrigeration system according to claim 12 in which said control means are responsive to the temperature of cooled medium leaving the evaporator.

14. An absorption refrigeration system according to claim 12 in which a bypass is provided about the valve means to assure flow of liquid heating medium through the generator regardless of load to provide preheating of solution in the generator even at zero load.

References Cited in the file of this patent

UNITED STATES PATENTS

| | | |
|---|---|---|
| 2,297,761 | Hainsworth | Oct. 6, 1942 |
| 2,565,838 | Berestneff | Aug. 28, 1951 |
| 2,592,712 | Knoy | Apr. 15, 1952 |
| 2,679,733 | Ashley | June 1, 1954 |
| 2,733,575 | Leonard | Feb. 7, 1956 |
| 2,775,097 | Berestneff | Dec. 25, 1956 |